(12) United States Patent
Kruppa

(10) Patent No.: US 6,243,504 B1
(45) Date of Patent: Jun. 5, 2001

(54) INTEGRATED MAGNETIC INK CHARACTER RECOGNITION SYSTEM AND METHOD THEREFOR

(75) Inventor: Robert William Kruppa, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/136,636

(22) Filed: Aug. 19, 1998

(51) Int. Cl.7 .................................................. G06K 7/00
(52) U.S. Cl. ............................. 382/318; 382/320
(58) Field of Search ................... 382/318, 320, 382/319, 321, 139, 312, 137, 140, 229, 301, 317, 231, 290, 292; 395/616, 230, 601, 609, 610; 434/159, 167

(56) References Cited

U.S. PATENT DOCUMENTS

| | | | |
|---|---|---|---|
| Re. 31,692 | * 10/1984 | Tyburski et al. | 382/7 |
| 3,938,089 | * 2/1976 | McGregor et al. | 340/146.3 |
| 3,949,363 | 4/1976 | Holm | 340/146.3 D |
| 4,201,978 | 5/1980 | Nally | 340/146.3 C |
| 4,315,246 | 2/1982 | Milford | 340/146.3 D |
| 4,555,617 | 11/1985 | Brooks et al. | 235/379 |
| 4,797,938 | * 1/1989 | Will | 382/7 |
| 4,876,735 | * 10/1989 | Martin et al. | 382/57 |
| 5,613,783 | 3/1997 | Kinney et al. | 400/73 |
| 5,678,046 | 10/1997 | Cahill et al. | 395/616 |
| 5,991,730 | * 11/1999 | Lubin et al. | 705/3 |
| 6,012,048 | * 1/2000 | Gustin et al. | 705/39 |

OTHER PUBLICATIONS

Media and Multi–Port Character Recognition, IBM Technical Disclosure Bulletin, vol. 29, No. 4, Sep. 1986, p. 1562.
Simple Optical Feedback for MICR E13B Encoder, IBM Technical Disclosure Bulletin, vol. 20, No. 1, Jun. 1977, pp. 241–243.

* cited by examiner

*Primary Examiner*—Joseph Mancuso
*Assistant Examiner*—Ali Bayat
(74) *Attorney, Agent, or Firm*—J Bruce Schelkopf; Winstead, Sechrest & Minick, P.C.

(57) ABSTRACT

An integrated character recognition system for providing high-accuracy detection of a magnetic ink character string of a printed medium. The character recognition system includes a magnetic ink character recognition system for reading and decoding the magnetic ink character string. An optical character recognition system is also included performing the integrated character recognition system thereby overcoming many of the limitations presented by conventional technologies. A system and method for performing complete processing of a printed media having a magnetic ink character string utilizes both the optical and magnetic ink character recognition systems to perform virtually error-free character recognition of the magnetic ink character string.

6 Claims, 5 Drawing Sheets

INTEGRATED MAGNETIC INK CHARACTER RECOGNITION SYSTEM AND METHOD THEREFOR

TECHNICAL FIELD

The present invention relates in general to a system and method for performing character recognition of printed media, and more particularly, to an integrated system and method employing optical and magnetic ink character recognition for providing identification and processing of printed media having magnetically encoded characters.

BACKGROUND INFORMATION

Various applications require the automated processing of materials having printed characters. Particularly for applications which are perfunctory in nature such as bill statement processing, payment check processing, or account credit processing, a system and method which can provide for high-accuracy, automated processing requiring little or no human intervention would be desirable for a number of factors. One very practical motivation for the development of such a system and method is the reduction of man-hours required to perform these tasks. Such a reduction in man-hours would correspondingly result in cost savings and increase efficiency. Another inherent advantage provided by an automated, high-accuracy system and method is a reduction in human error thereby providing more reliability and efficiency.

One particular application which requires the processing of printed media that is well-known to a vast majority of the population is the processing of a payment check at a point of sale within the context of a financial transaction. A typical point of sale system might constitute a cash register at a checkout counter within a commercial retail store. In such an instance, either one or very few employees perform all of the duties associated with receiving payment for the purchased items, packaging the purchased items, and providing the customer with a sales receipt. If an automated system and method were developed which would perform one or more of the tasks required of the employee at the point of sale, then the employee would have more free time and could then provide the customer with faster and more efficient service.

One such point of sale system has been developed in an attempt to assist the processing of payment checks within the context of a financial transaction. Part of the check processing includes reading of special characters located at the bottom of each check which are called Magnetic Ink Character Recognition (MICR) characters. These characters were developed by and are used by the banking industry to assist in payment check processing and tracking once a payment check leaves a retail store. The MICR characters include such information as bank routing number, customer account number, check sequence number, or other information as specified by individual banks or credit institutions. MICR characters are specially formed characters that are similar to normal digits of zero to nine. Additionally, they include an additional four special characters that are used to separate the various MICR fields. The MICR characters are printed with a magnetic ink such that they can be magnetized and read "magnetically."

Reading characters magnetically using a magnetic ink character recognition system offers a certain degree of protection against fraudulent activities including the alteration or modification of the characters' appearance. Consumer stores that accept payment checks will often use the MICR information to verify that the check is valid and acceptable for tender. A typical store solution for performing payment check processing will often include input/output (I/O) devices such as printers, keyboards, displays, and MICR readers. One disadvantage of using a separate MICR reader is that it requires additional counter space, communications cables, and power cables. Kinney, et al., U.S. Pat. No. 5,613,783 addresses the integration of a MICR reader within the confines of the printer housing for maximizing counter space usage of a point of sale system.

Magnetically reading MICR characters typically utilizes a read head having a single channel that is passed over the MICR character string (sometimes referred to as a MICR codeline). Signals are produced when the read head traverses from a non-magnetic region (paper background) to a magnetic background (edges of a MICR character) or from a magnetic region to a non-magnetic region. Each time this boundary is passed a pulse is generated in the read head. A read head coming into a character edge will produce a positive signal whereas a read head coming out of a character edge will produce a negative signal. These signal images are converted into digital data, stored, and then compared to known images of MICR characters using a magnetic image processor comprising a computer microprocessor. Typically, the comparisons are based upon number and type of pulses (positive or negative), time between pulses, and the magnitude of each pulse. Once recognized by the decode algorithm the data is passed and displayed using a data transmission and display system for further processing. Such a system might typically include data transmission cables and a video display monitor for displaying relevant information concerning the printed media having the magnetic ink character string.

In reality, the formed MICR characters of a printed medium often possess irregularities which make difficult the proper recognition of the magnetic ink character string. The magnetic ink characters might not be perfect in size, location on the check, or magnetic particle density. Additionally, the magnetic ink character string might possess inking problems making even more difficult proper recognition. Any of these deleterious characteristics may create problems for a decode algorithm tasked with performing character recognition resulting in either a non-readable character or incorrect reading of a character, commonly referred to as a "substitution error." Furthermore, given that this character recognition technology relies solely on magnetic mechanisms, external magnetic sources may create noise problems of sufficient magnitude as to cause errors in recognizing the magnetic ink character string.

"Read rate" is a term of the character recognition art used to describe the percentage of error free reads which are performed in a given group of character recognition attempts. Typical read rates for magnetic ink character recognition systems are in the mid-ninety percent range. With "clean checks" that do not contain any of the inking problems previously described, the read rates may be as high as one hundred percent whereas checks that do contain inking problems typically have read rates near ninety percent. A mix of typical checks which passes through a point of sale, payment check processing system will commonly have a read rate in the mid-ninety percent range.

Another problematic source that may contribute to low read rates is magnetic or electrical field noise, commonly referred to as electromagnetic interference. This type of noise may typically be generated from a display system or a security tower, both of which are common devices in a point of sale system. In some instances, the electronic devices contributing to these noise sources can be physically moved resulting in a lowering of the electromagnetic induced noise from the emitted field of the noise source. However, in many cases these devices may not be moved as they are required to be in close proximity of a point of sale system for providing services to assist in the financial transaction. A monitor will produce a repeatable noise pulse which may be coupled magnetically into the coil of the read head. This noise source can affect the ability of the MICR algorithm to properly and accurately decode the magnetic ink character string.

Changes in the banking industry may render typical read rates in prior art MICR systems inadequate. The banking industry has been considering a new process wherein a check would be read at a point of sale station system, the account of the payment check adjusted, the front and back sides of the payment check printed with the appropriate transaction information, and the completely processed payment check then returned immediately to the customer to finish the transaction. Magnetic ink character recognition systems having exceptionally high read rates will necessarily be required for achieving this goal. An improvement of the present read rate provided by technologies employing strictly magnetic ink character recognition methods is necessarily mandated to ensure reliable payment check processing in such advanced payment check processing systems. An error rate of five percent, corresponding to a read rate of ninety-five percent, is a significant error rate and would be entirely unacceptable for integration within such an automated payment check processing system as envisioned by the banking industry. To achieve a system capable of operation without significant human intervention such as the one desired by the banking industry, a more reliable, higher-accuracy magnetic ink character recognition system must be developed.

SUMMARY OF THE INVENTION

The present invention provides a character recognition system and method for performing character recognition of a magnetic ink character string utilizing an integrated system employing magnetic ink character recognition technology and optical character recognition technology that addresses the previously mentioned needs.

More specifically, the present invention provides a system and method for performing character recognition of a magnetic ink character string contained within a printed medium. A typical printed medium having a magnetic ink character string that is commonly known to a vast majority of the population would include a payment check acceptable as legal tender in virtually all financial transactions. However, those having skill in the art of character recognition systems will appreciate the applicability of the present invention in any system requiring accurate and speedy processing of printed media beyond the next processing of payment checks in a financial transaction. Other typical applications might include perfunctory duties such as the directing and routing of mailed items or the printing and mailing of billing statements for service providers. The integrated, high-accuracy character recognition system and method includes a magnetic ink character recognition system and an optical character recognition system. Both the magnetic ink and optical character recognition systems are operable for recognizing a magnetic ink character string of a printed medium. These two systems which perform character recognition may be operated simultaneously with one another in performing magnetic ink character recognition. If desired, the optical character recognition system's operation may be bypassed if the magnetic character recognition system properly recognizes the magnetic ink character string and initiated in the event of the magnetic character recognition system's failure to properly recognize the magnetic ink character string to provide redundancy in character recognition. The converse may also be performed in that the magnetic character recognition system's operation may be bypassed if the optical character recognition system properly recognizes the magnetic ink character string and initiated in the event of the optical character recognition system's failure to properly recognize the magnetic ink character string. Because the present invention can operate the two systems simultaneously (for example, to compare the character recognitions with one another) or sequentially (for example, to perform character recognition with the second system when the first system is unable to recognize the character properly), the present invention has multiple advantages, including both an increased accuracy and efficiency.

The specific application of the present invention within a point of sale system, for the processing of a payment check, might include a printed media feed-through system into which the payment check is fed and processed.

The present invention provides an important technical advantage by reducing the recognition error of a magnetic ink character string. By employing completely independent character recognition systems, the recognition error of the magnetic ink character string may be reduced substantially.

The present invention provides another technical advantage by providing a character recognition system which is immune to electromagnetic and radio frequency interference. Point of sale systems typically comprise multiple electronic devices in close proximity with the read head of a magnetic ink character recognition system. The emitted electric and magnetic fields from these electronic devices may undesirably interact with the coil of the read head resulting in performance defects such as improper character recognition.

The present invention provides another technical advantage by automating the processing of a printed medium having a magnetic ink character string. Particularly for applications involving a point of sale system, by eliminating one of the tasks that a cashier must perform in processing a sale, the present invention may assist the cashier in providing more efficient and timely service. Another advantage which the present invention provides for a point of sale system is the reduction in the number of devices required to perform processing of a payment check by its inherent, integrated nature.

By providing magnetic ink and optical character recognition of a magnetic ink character string of a printed medium, the present invention provides a single solution for the processing of printed media. The advantages of cost savings may be realized both in the amount of hardware required to perform the character recognition as well as the reduction in man hours required to perform the processing of the printed media.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
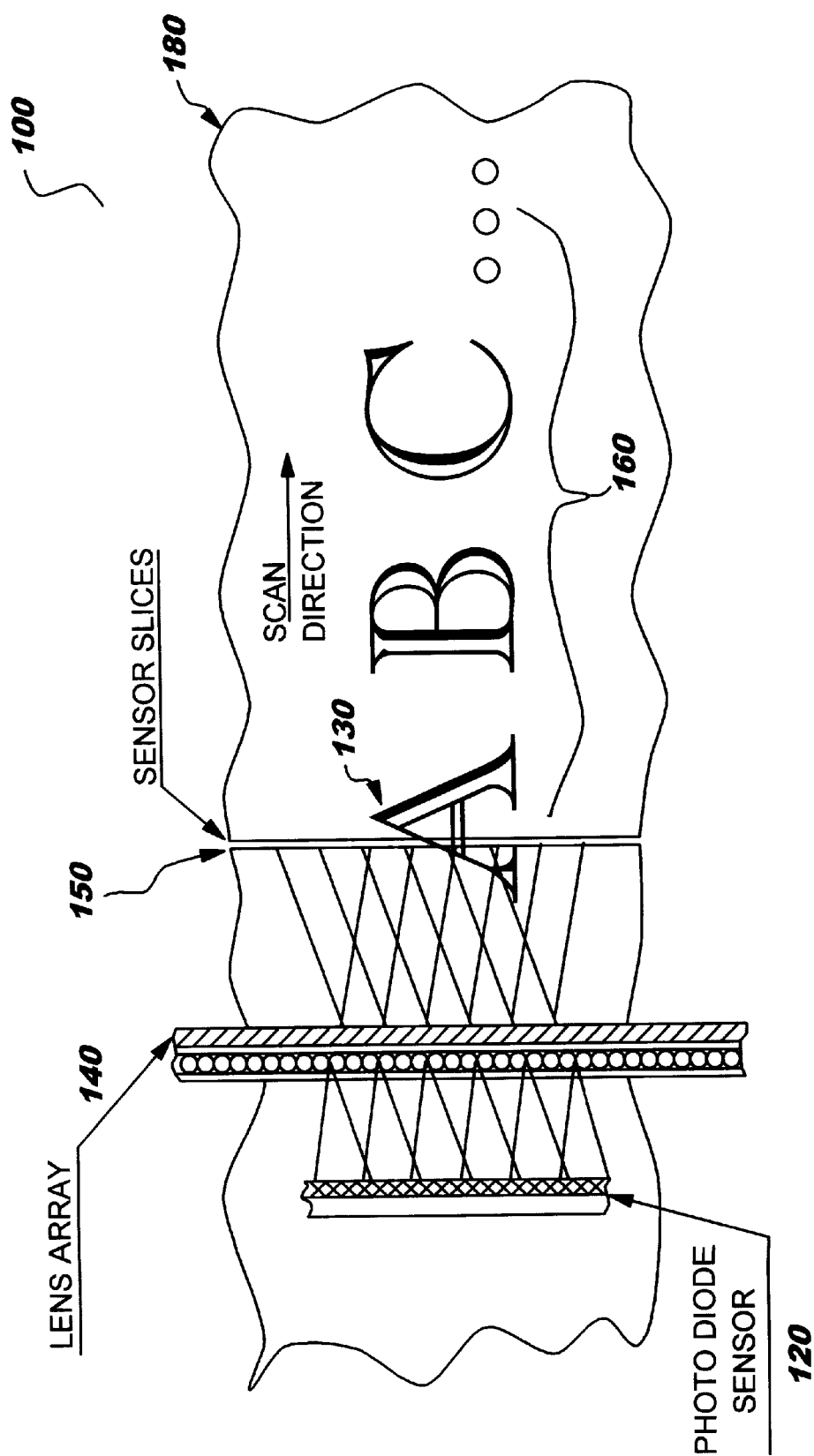
FIG. 1 illustrates one embodiment of an optical character recognition system.

In the following description, numerous specific details are set forth such as resolution (dots/inch) or read rates, etc. to provide a thorough understanding of the present invention. However, it will be obvious to those skilled in the art that the present invention may be practiced without such specific details. In other instances, well-known devices have been described in general form in order not to obscure the present invention in unnecessary detail. For the most part, details concerning elements such as electronic circuitry, sub-elements of functional elements, interfacing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several FIGURES.

The present invention includes both a magnetic ink character recognition system and an optical character recognition system for performing character recognition of a printed medium having a magnetic ink character string. Conventional character recognition systems often employ magnetic ink character recognition technologies to assist in the identification and processing of documents. Typically, a magnetic ink character string is printed across the bottom or along the side of a document, and that portion of the document is scanned using a read head of a magnetizing assembly. Once the particular document is identified, the document may be processed for any number of functions including the adjusting of a financial account or the directing of the document in a mail distribution system. The present invention provides a single solution for performing character recognition of a magnetic character string which overcomes many limitations presented by conventional technologies.

The present invention integrates a complementary optical character recognition system with a conventional, magnetic ink character recognition system to provide an increased read rate when compared to character recognition systems which rely entirely upon conventional, magnetic ink character recognition technology.

The optical character recognition system of the invention may be configured always to perform reading of a printed medium having a magnetic ink character string. In such a configuration, the optical character recognition system would optically read the magnetic ink character string of the printed medium every time the character recognition system is employed. A pixel representation of the magnetic ink character string would then be generated which could later be decoded for performing the identification of the magnetic ink character string using the optically generated pixel representation. Such a parallel means for performing character recognition may be used to provide redundancy in the character recognition process, thereby providing an increased read rate and further enabling the use of the character recognition system, given its increased performance, in applications which necessitate extremely high-accuracy character recognition. In another embodiment, the present invention may be used to provide a system which performs complete processing of a payment check including identification of the payment check itself, the validation and authorization of it, the debiting of the financial account from which it was written, and the returning of the payment check to its issuer.

The optical character recognition system of the invention provides for more accurate character recognition than that which is provided by a magnetic ink character recognition system in that the individual characters of the magnetic ink character string are each read with multiple slices using a scanning process wherein each individual slice, which constitutes a sub-part of one or more characters of the magnetic ink character string, contains several hundred bits per inch of resolution. In contrast, a magnetic ink character recognition system having a single magnetic read head only detects the edge transitions of each magnetic ink character in its character recognition process. The increased read rate and accuracy of proper character recognition is provided in one respect by the fact that the optical character recognition system provides a character resolution of a significantly increased value as compared to conventional, magnetic ink character recognition systems.

The operational character recognition function 100 of the optical character recognition system is shown in FIG. 1. Basic elements of the optical character recognition system might include a plurality of optical detectors 120. The plurality of optical detectors 120 may comprise an array of conventional photo-diodes or any other technology capable of performing intensity-sensitive, optical detection. Additionally, a plurality of focusing lenses 140 may also be used for focusing the image of a magnetic ink character string 160, which is contained within an image plane, to the plurality of detectors 120. The photo-diode array may relatively easily partition the working area of the magnetic ink character string of a printed medium to provide a 1×200 pixel array, in one embodiment.

As the printed medium 180 having the magnetic ink character string 160 moves past the plurality of focusing lenses 140 which direct the image of the printed medium to the plurality of optical detectors 120, a character 130 of the magnetic ink character string 160 is itself partitioned into image slices 150 from which data is taken and stored using an optical processor which may be used to form a pixel representation of the character 130. Typical resolution for conventional, photo-diode arrays as described herein often fall within the range of 200 to 300 dpi (dots/inch). An embodiment of the optical character recognition system takes the data in a serial manner as a function of the plurality of optical detectors 120 and then streams the data to the optical processor for storage into memory. If desired, a single, integrated processor may be used to perform the functions of both the optical and magnetic processors of the present invention (see FIG. 5).

Figure 2:
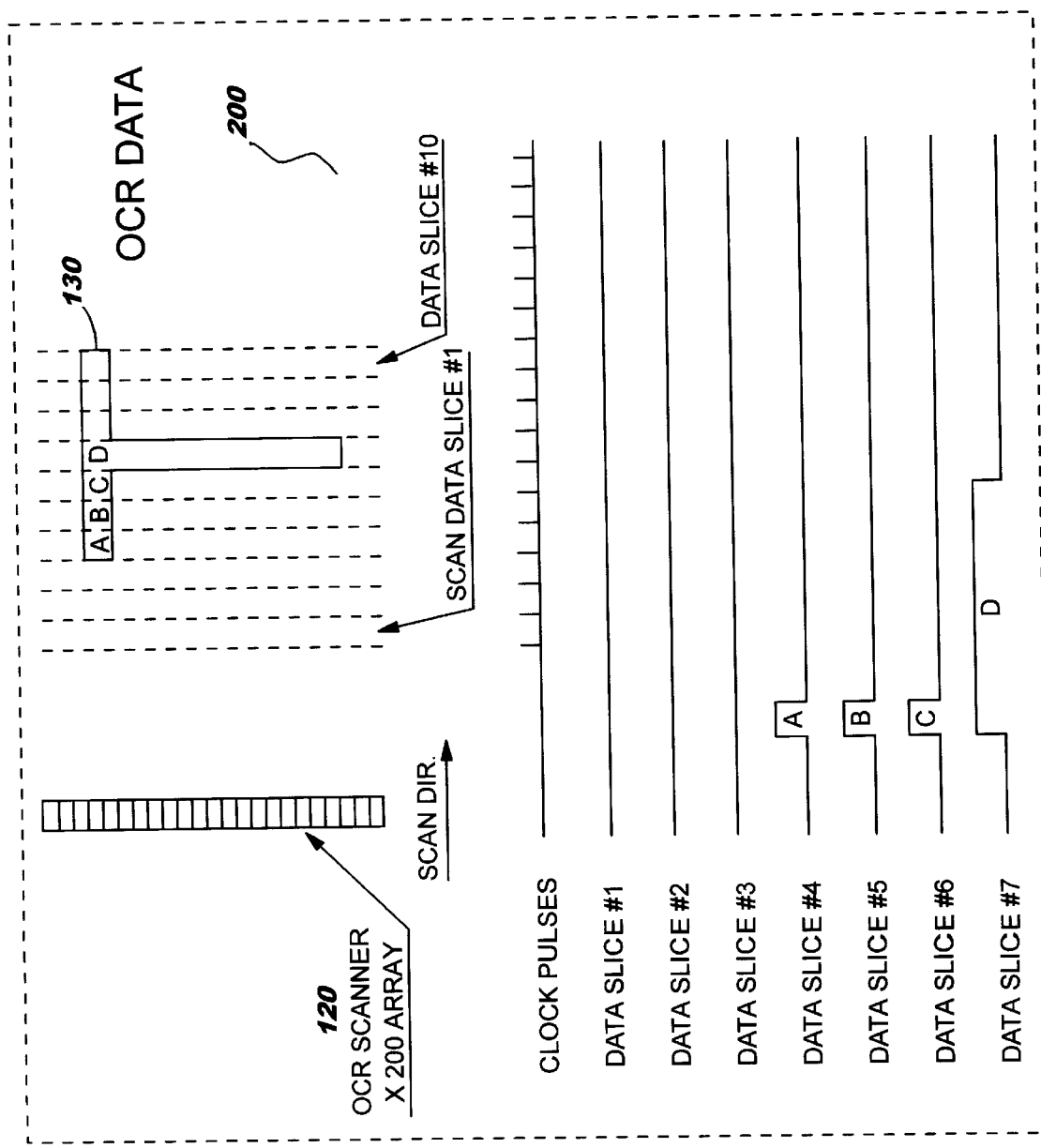
FIG. 2 illustrates the manner in which a character may be scanned using one embodiment of an optical recognition system as shown in FIG. 1.

FIG. 2 shows a practical example 200 of how a character 130 of a magnetic ink character string 160 may be scanned using the optical character recognition system. The plurality of optical detectors 120 is scanned in a first direction over the character 130 whereas the image slices 150 are aligned in a second direction, typically orthogonal to the first direction. As the plurality of optical detectors 120 is scanned and starting with Data Slice #1, there is not yet any character information to be scanned, and the data that are transferred to the optical processor may consequently be encoded to contain all "0" bits indicating no data yet to be stored. The same would be true for Data Slices #2, as a character 130 of the magnetic ink character string 160 has not yet been encountered. Once data Slice #4 is positioned over a portion of the character 130, namely the region "A" of the horizontal bar of the letter "T", data of that particular image slice 150 will be encoded to form a pixel representation corresponding to that slice which may then be used to form a pixel representation of the entire character 130. This process continues until a pixel representation may be formed for the entire magnetic ink character string 160, i.e. additional slices are recorded as the plurality of optical detectors 120 continues to scan in the first direction to form a pixel representation of the entire magnetic ink character string 160. The data bits representing the pixel representation may be encoded to contain "1" bits, as opposed to "0" bits, to indicate that portion of a particular character of the magnetic ink character string that was in the image slice 150 of the photo diode sensor that will then be transferred to the optical processor. The encoding of "1" and "0" bits is merely exemplary of a method to represent data showing magnetic ink character string 160, and any system or method capable of distinguishing between the printed and non-printed portions of a printed medium may be used without departing from the scope and spirit of the invention.

This scanning process continues until each character 130 of the entire magnetic ink character string 160 is read. Typically, this data is transferred to the optical processor where it may be processed or decoded for performing recognition of the magnetic ink character string 160. After processing and properly recognizing the magnetic ink character string 160, the data depicting the identity of the string may be transferred and displayed using a data transmission and display system. If desired, the data may be transferred to and stored in Random Access Memory (RAM) located on any logic circuit board contained within any number of elements including a printed media feed-through system, the data transmission and display system, the optical processor itself, or a processor comprising both the optical processor and the magnetic processor.

In one embodiment of the invention, the optical character recognition system may be used to perform comparison of the processed data taken using the optical character recognition system and the data taken using the magnetic ink character recognition system. In such an embodiment, a final decision concerning the identification of the magnetic ink character string 160 may not be made until after the comparison of the two sets of data is completed. If both data identify the same magnetic ink character string 160, then a positive identification is assumed. If the data disagree, then the identification process may either be repeated, or an error signal may be generated to notify the character recognition system operator of the inability of the character recognition system to recognize the magnetic ink character string 160.

Figure 3:
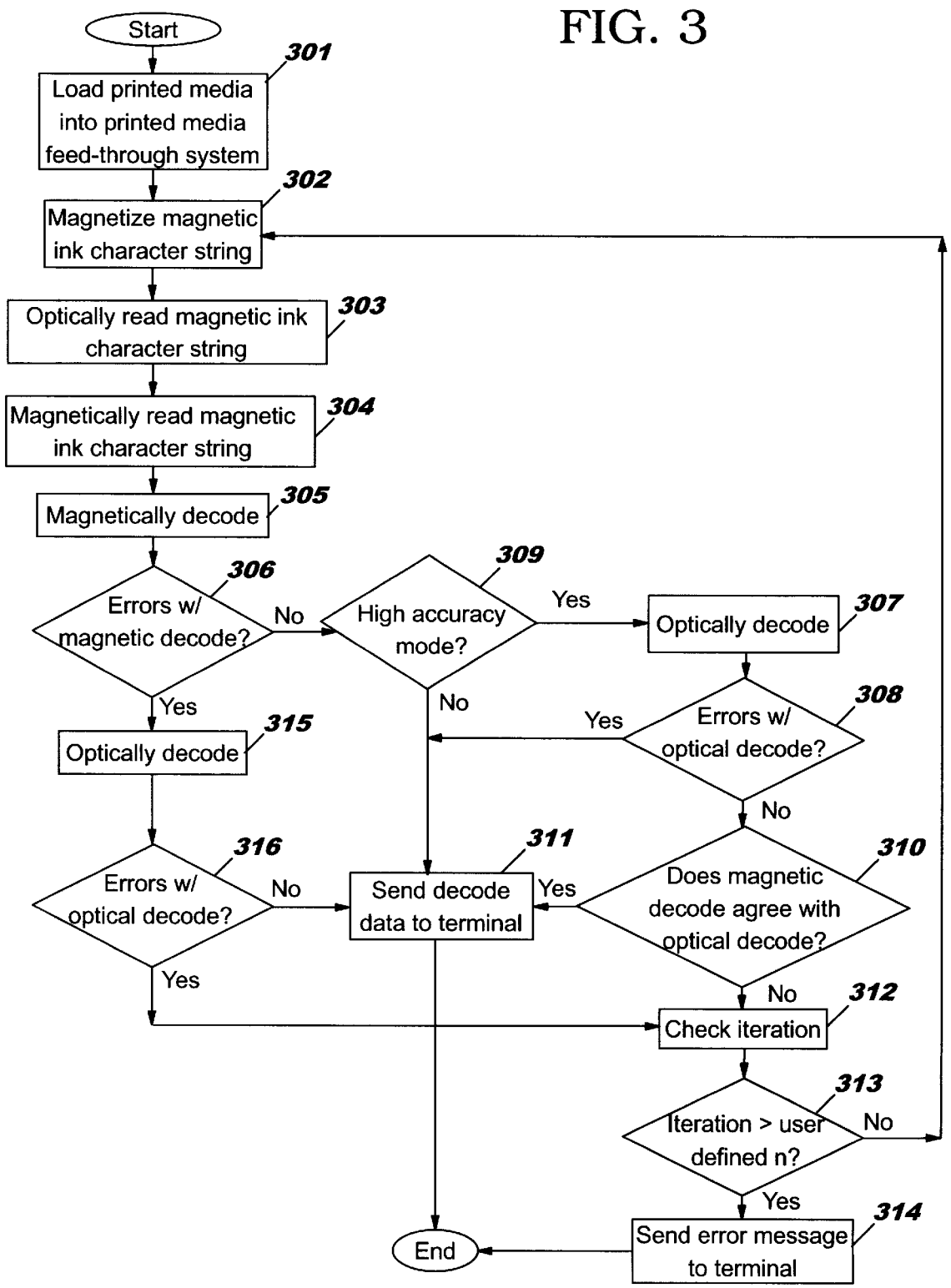
FIG. 3 illustrates an operational diagram of an integrated, optical and magnetic ink character recognition system used to perform character recognition.

FIG. 3 illustrates a flowchart indicating the process for reading a magnetic ink character string of a printed medium. In this embodiment of the invention, a printed medium is inserted into a printed media feed-through system in step 301 and upon the delivery of a command from a user interface adapter 422 (see FIG. 4) to start the reading process of the magnetic ink character string 160 of the document. Once this command is received, in step 302 the printed medium is fed past a magnetizing assembly that magnetizes the magnetic ink particles embedded in the individual characters of the magnetic ink character string 160. Once the characters themselves are magnetized, they then provide a magnetic field that the read head senses as the now magnetized, magnetic ink character string 160 passes by it. The printed medium then traverses along a predetermined path during which time the magnetic ink character string 160 is read magnetically in step 304 by the read head of the magnetic ink character recognition system and read optically in step 303 by the plurality of optical detectors 120 of the optical character recognition system. These data acquired by these two systems are stored and may be used after the optical and magnetic read processes are completed.

A conventional magnetic ink character recognition system employing a read head will typically produce an analog electrical signal representing the waveforms unique to each magnetic ink character. This analog signal is sent to an input of an analog to digital (A/D) converter which generates a digital representation of the analog magnetic ink character signal (see FIG. 5). Similar to how the optical data of the pixel representation of the magnetic ink character string 160 is stored, the digital data corresponding to the magnetic data taken using the read head may also be stored in for further processing including magnetic decoding of the magnetic ink character string 160 in step 305.

The present invention then continues to check in step 306 if any errors occurred during the magnetic decoding of step 305. If any magnetic decode error is identified in step 306, then the invention may be configured to then perform an optical decoding of the magnetic ink character string 160 in step 315. Also, even if no errors are identified in step 306, the present invention may be operating in a high accuracy mode such that optical decoding is performed in step 307. This mode of operation, (i.e. whether it is operating in high accuracy or not), is determined in step 309. If no errors are identified during the magnetic decode process and the invention is not operating in its high accuracy mode, then the data is then sent to a display device 438 (see FIG. 4) for processing of the printed medium in step 311. This data may include any information which a user requires for processing the printed medium. In this situation, the present invention ends its processing of the selected printed medium.

However, if a magnetic decode error is identified in step 306, then the invention performs optical decoding of the magnetic ink character string 160 in step 315. Subsequently, the invention checks in step 316 if any errors occurred during the optical decoding of step 315. If errors have occurred during the optical decoding of step 315, then the invention begins the entire process afresh by returning to magnetize the magnetic ink character string in step 302. As discussed in more detail below, a counter may be used to keep track of how many failures have occurred in attempting to optically decode the magnetic ink character string. If no errors are identified during the optical decode process of step 315, then the data is then sent to the display device 438 for processing of the printed medium in step 311. Again, this data may include any information which a user requires for processing the printed medium. In this situation, the present invention ends its processing of the selected printed medium.

And, if the invention is operating in high accuracy mode as identified in step 309, then the invention performs optical decoding of the magnetic ink character string 160 in step 307. Subsequently, the invention checks in step 308 if any errors occurred during the optical decoding of step 307. If errors have occurred during the optical decoding of step 307 and errors have occurred during the magnetic decoding of step 305, then the invention begins the entire process afresh by returning to magnetize the magnetic ink character string in step 302. Again, and as discussed in more detail below, a counter may be used to keep track of how many failures have occurred in attempting to optically decode the magnetic ink character string. However, if errors have occurred during the optical decoding of step 307 but no magnetic decode errors are identified in step 305, then the data is then sent to the display device 438 (see FIG. 4) for processing of the printed medium in step 311. Again, this data may include any information which a user requires for processing the printed medium. In this situation, the present invention ends its processing of the selected printed medium.

As noted above, if desired in the interim, a counter may be used to keep track of how many failures have occurred in attempting to optically decode the magnetic ink character string. This counter could be user-defined to a number n. Such an option would serve to allow an operator to maintain autonomy over the operation of the system and keep the invention from entering into a infinitely iterative loop should a check be unidentifiable. If optical decode errors are identified in step 308, the counter could be checked in step 312 to see if it exceeds user-defined n. If the counter exceeds the threshold of user-defined n as determined in step 313, then an error message could be sent to the display device 438 (see FIG. 4) in step 314. If this threshold is not surpassed then again the process could again begin afresh by returning to magnetize the magnetic ink character string in step 302 in an effort to identify properly the magnetic ink character string 160.

If no optical decode errors are identified in step 308 and no magnetic decode errors are identified in step 305, the invention then may compare the data derived from both the magnetic and optical decode steps to see if they agree in step 310 in identifying the same magnetic ink character string 160. If there is not agreement, then the invention follows the path of checking the iteration number as described above involving steps 312, 313, and 314. If, however, agreement is found in step 310 between the optical and magnetic decode steps of 305 and 307, then the system sends the data to the display device 438 (see FIG. 4) for processing of the printed medium in step 311. After this is performed, the present invention ends its processing of the selected printed medium upon successful identification of the magnetic ink character string 160 using both magnetic and optical decoding.

One embodiment of the present invention may provide for the use of the magnetic ink character recognition system to perform the primary character recognition of the system. In such an embodiment, the optical character recognition system would be used to provide redundancy in character recognition or to perform some supplementary function besides merely performing character recognition. For example, in such an embodiment of the invention, if the magnetic character recognition system were unable to recognize one or more characters of the magnetic ink character string 160, then the optical character recognition system would be enabled to perform character recognition using the optical character recognition system. This process can be used to identify those magnetic ink characters that the magnetic sensor failed to recognize. If the optical character recognition system function is able to remove all the errors from the data acquired using the magnetic ink character recognition system, then the data are passed to the display device 438 (see FIG. 4) for further processing. If errors still exist after the optical character recognition system has been employed, then the read process may be restarted a second time. If after the second pass errors still exit, an error message may be sent using the data transmission and display system indicating an inability to perform proper character recognition.

Alternatively, a selector 507 (see FIG. 5) operable for selecting high-accuracy character recognition may provide an operator of the character recognition system with the option of performing optical character recognition at all times, irrespective of a failure of the magnetic ink character recognition system to identify all of the characters of the magnetic ink character string 160. In this embodiment, even if a successful read is obtained by the magnetic character recognition system, the optical character recognition system may nevertheless be invoked to perform character recognition to provide a supplementary function such as a "Scoring" function for determining the confidence or success level of the magnetic character recognition system. By providing such information to the character recognition system, a higher degree of accuracy in the prediction process would result in fewer substitution errors, or a reduction in the misidentification of characters within the magnetic ink character string 160. The optical decoding results may be used in a variety of manners as described above including performance verification of the magnetic ink character recognition system.

Figure 4:
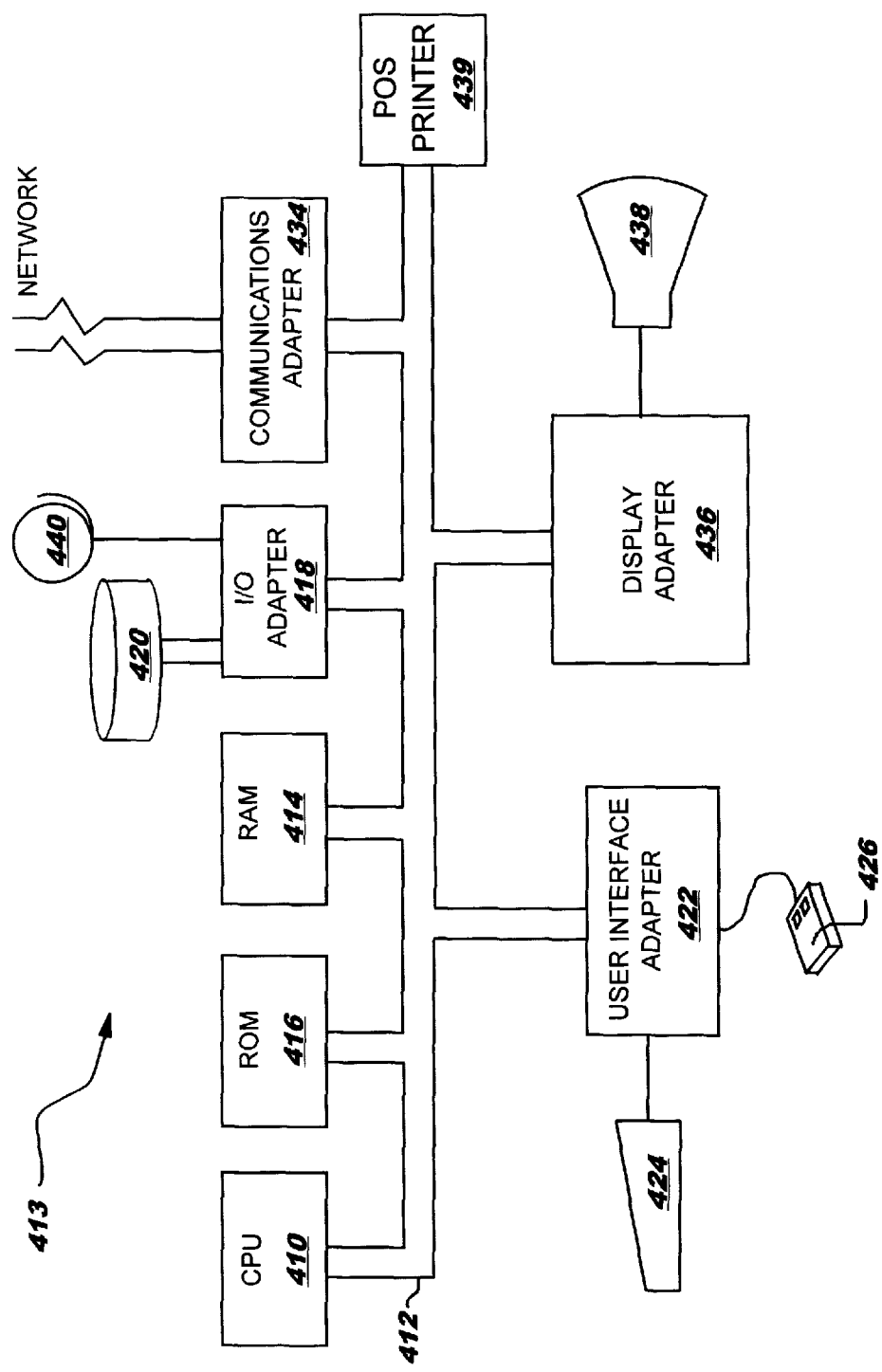
FIG. 4 illustrates a representative hardware environment for practicing the present invention.

A representative hardware environment for practicing the present invention is depicted in FIG. 4, which illustrates a typical hardware configuration of a point of sale (POS) workstation 413 in accordance with the subject invention having central processing unit (CPU) 410, such as a conventional microprocessor, and a number of other units interconnected via system bus 412. Workstation 413 may include random access memory (RAM) 414, read only memory (ROM) 416, and input/output (I/O) adapter 418 for connecting peripheral devices such as disk units 420 and tape drives 440 to bus 412, user interface adapter 422 for connecting keyboard 424, mouse 426, and/or other user interface devices such as a touch screen device (not shown) to bus 412, communication adapter 434 for connecting workstation 413 to a data processing network, and display adapter 436 for connecting bus 412 to display device 438. POS printer 439 will include the OCR and MICR read heads and accompanying circuitry described herein.

Figure 5:
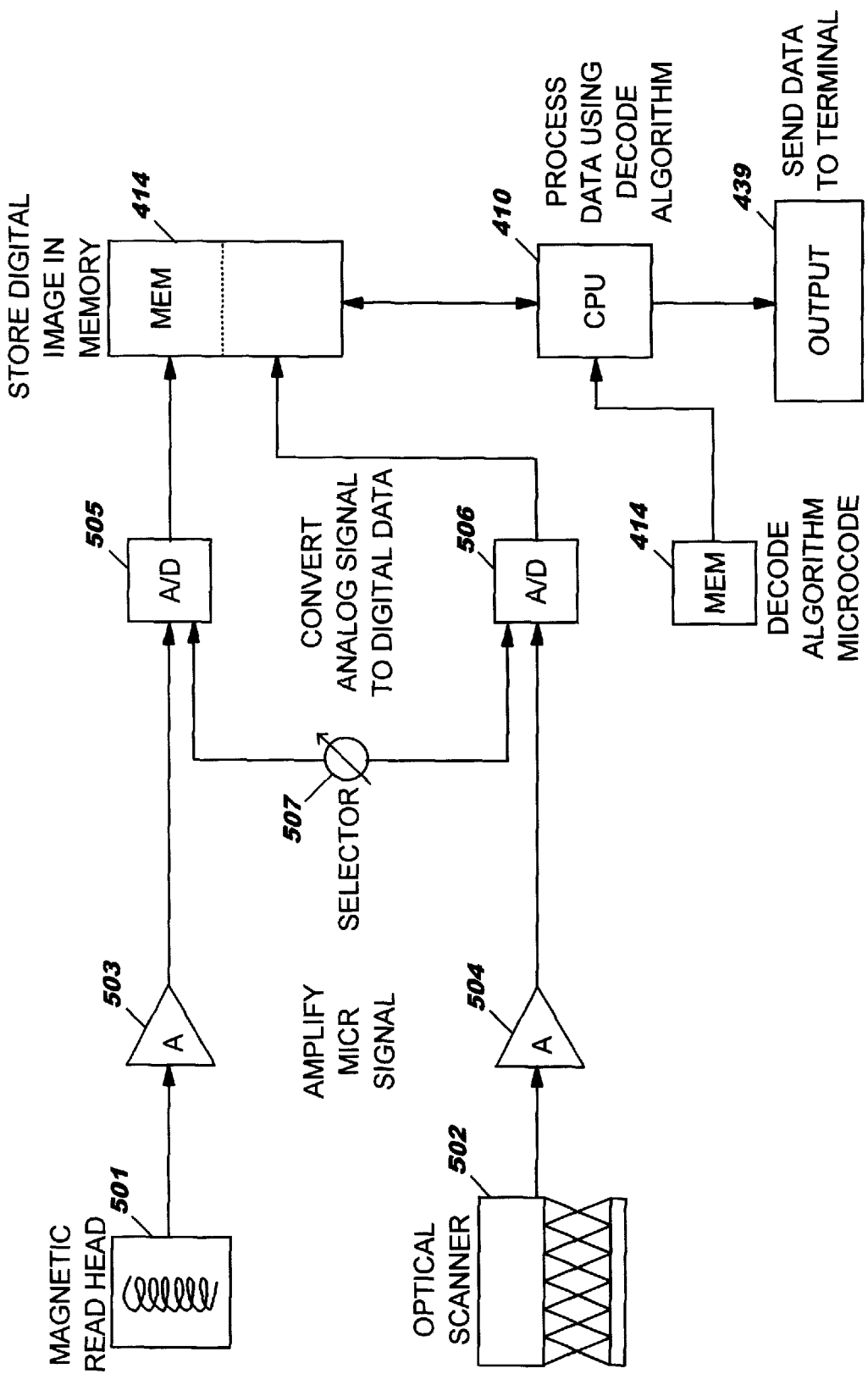
FIG. 5 illustrates a functional block diagram depicting the operational interaction between the optical and magnetic ink character recognition systems while in operation.

FIG. 5 illustrates a functional block diagram depicting the operational interaction between the optical and magnetic ink character recognition systems while in operation.

Magnetic read head 501 and optical scanner 502 output their results (see steps 303 and 304 in FIG. 3) to amplifiers 503 and 504 respectfully. These amplified signals are then sent to analog to digital (A/D) converters 505 and 506, respectfully. The outputs of these A/D converters are then sent to RAM 414 for storage of the digital images. Processor 410 then performs the decoding of the digital images in accordance with a decode algorithm microcode stored in RAM 414, in accordance with the process described above with respect to FIG. 3. Step 311 is then performed by the output of the data from CPU 410 to POS printer 439.

The present invention, by performing character recognition using both optical and magnetic ink character recognition systems provides many technical advantages over conventional technologies which employ solely a magnetic ink character recognition system for identifying a magnetic ink character string of a printed medium. One technical advantage over conventional technology is the capability to provide backup data for those characters that could not be read by the magnetic ink character recognition system.

Another technical advantage of the present invention is the capability of performing character recognition using both the optical and magnetic ink character recognition systems to provide high-accuracy character recognition.

Another technical advantage of the present invention is provided by the intrinsic optical nature of the optical character recognition system and its immunity to electromagnetic interference. The optical character recognition system is capable of performance even when placed in an area having high magnetic or electric noise. Also, the optical character recognition system may be used to perform the "Scoring" function as described above in an effort to quantify the performance of the magnetic ink character recognition system.

An integrated character recognition system employing optical and magnetic ink character recognition of a magnetic ink character string may be used to provide several technical advantages over conventional magnetic ink character recognition systems which employ only a magnetic ink character recognition system.

The combination of both a magnetic and optical reader will greatly increase the read rates for performing character recognition of a printed medium having a magnetic ink character string. By integrating these two functions into a point of sale printer as described within one embodiment of the invention, a unique function may be provided wherein complete payment check processing may be performed in the absence of operator intervention. Such a complete processing system might include recognizing the magnetic ink character string of a payment check, endorsing the back of the check and printing the face of the check, adjusting the financial account from which the check was written to cover the transaction amount, and then immediately returning the payment check to the issuer. Such an automated payment check processing system would free a cashier's time to perform other duties required by the transaction thereby permitting him to provide greater personal customer service. Additionally, the number of electronic devices on the checkout stand may be reduced by integrating these many functions into a single character recognition system.

Although the present invention and its advantages have been described in detail, it should be understood that various changes, substitutions and alterations can be made herein without departing from the spirit and scope of the invention as defined by the appended claims.

What is claimed is:

1. A method for recognizing a magnetic ink character string comprising the steps of:
    (a) loading printed media comprising said magnetic ink character string into a printed media feed-through system;
    (b) magnetizing said magnetic ink character string;
    (c) reading said magnetic ink character string optically;
    (d) reading said magnetic ink character string magnetically;
    (e) decoding magnetically said magnetic ink character string;
    (f) decoding optically said magnetic ink character string; and
    wherein if errors occurred in said decoding said magnetic ink character string optically and magnetically, said errors being magnetically decoded in step (e) and optically decoded in step (f), then the method farther comprises the step of:
    repeating steps (b)–(f).

2. The method as recited in claim 1, wherein the number of times steps (b)–(f) are repeated is tracked by a counter.

3. The method as recited in claim 1, wherein if steps (b)–(f) are repeated more than a predetermined threshold amount of times, then the method further comprises the step of:
    sending an error message to a display device.

4. A character recognition system of a magnetic ink character string comprising:
    a printed media feed-through system for loading a printed media;
    a magnetic ink character recognition system operable for recognizing said magnetic ink character string, wherein said magnetic ink character recognition system is operable to perform:
        (a) reading said magnetic ink character string magnetically;
        (b) decoding magnetically said magnetic ink character string;
    an optical ink character recognition system operable for recognizing said magnetic ink character string, wherein said optical ink character recognition system is operable to perform:
        (c) reading said magnetic ink character string optically;
        (d) decoding optically said magnetic ink character string; and
    wherein if errors occurred in said decoding said magnetic ink character string optically and magnetically, said errors being magnetically decoded in step (e) and optically decoded in step (f), then steps (a)–(d) are repeated.

5. The system as recited in claim 4, wherein the number of times steps (a)–(d) are repeated is tracked by a counter.

6. The system as recited in claim 4, wherein if steps (a)–(d) are repeated more than a predetermined threshold amount of times, then an error message is sent to a display device.

* * * * *